US008589533B2

(12) United States Patent
John et al.

(10) Patent No.: US 8,589,533 B2
(45) Date of Patent: Nov. 19, 2013

(54) SYSTEM AND METHOD FOR MAINTENANCE SUPPORT

(75) Inventors: Dirk John, Karlsruhe (DE); Roland Braun, Niederkassel Lülsdorf (DE); Stefan Bollmeyer, Minden (DE); Frank Fengler, Minden (DE); Georg Hilsch, Minden (DE)

(73) Assignee: ABB AG, Mannheim (DE)

( * ) Notice: Subject to any disclaimer, the term of this patent is extended or adjusted under 35 U.S.C. 154(b) by 622 days.

(21) Appl. No.: 12/185,979

(22) Filed: Aug. 5, 2008

(65) Prior Publication Data

US 2009/0043885 A1 Feb. 12, 2009

(30) Foreign Application Priority Data

Aug. 7, 2007 (DE) .......................... 10 2007 037 247

(51) Int. Cl.
*G06F 15/173* (2006.01)
(52) U.S. Cl.
USPC ............................ 709/224; 709/238; 715/859
(58) Field of Classification Search
USPC ......................................................... 709/224
See application file for complete search history.

(56) References Cited

U.S. PATENT DOCUMENTS

| | | | |
|---|---|---|---|
| 6,138,056 A * | 10/2000 | Hardesty et al. ............... 700/174 |
| 2002/0095323 A1 * | 7/2002 | Combs et al. ..................... 705/8 |
| 2003/0051077 A1 * | 3/2003 | Fengler ............................. 710/8 |
| 2003/0056004 A1 * | 3/2003 | Argentieri et al. ............ 709/238 |
| 2004/0235562 A1 * | 11/2004 | Kiely et al. ..................... 463/29 |
| 2005/0171661 A1 * | 8/2005 | Abdel-Malek et al. ......... 701/33 |
| 2005/0187649 A1 * | 8/2005 | Funk et al. .................... 700/121 |
| 2006/0010006 A1 * | 1/2006 | Kreidler et al. ................... 705/1 |
| 2006/0074494 A1 * | 4/2006 | McFarland ........................ 700/1 |
| 2006/0184411 A1 * | 8/2006 | Gross et al. ........................ 705/8 |
| 2006/0206289 A1 * | 9/2006 | Stake et al. .................... 702/184 |
| 2007/0033087 A1 * | 2/2007 | Combs et al. ..................... 705/8 |
| 2007/0035398 A1 * | 2/2007 | Vesel ......................... 340/572.1 |
| 2007/0197229 A1 * | 8/2007 | Kalliola et al. ............ 455/456.1 |
| 2007/0247366 A1 * | 10/2007 | Smith et al. ................... 342/464 |
| 2008/0082258 A1 * | 4/2008 | Pham et al. ................... 701/206 |
| 2008/0084314 A1 * | 4/2008 | Dipiazza .................... 340/573.1 |
| 2008/0195963 A1 * | 8/2008 | Eisen et al. ................... 715/772 |
| 2009/0066473 A1 * | 3/2009 | Simons ......................... 340/3.1 |
| 2009/0271745 A1 * | 10/2009 | Sakamoto et al. ............ 715/859 |

* cited by examiner

*Primary Examiner* — Hamza Algibhah
(74) *Attorney, Agent, or Firm* — Buchanan Ingersoll & Rooney PC

(57) ABSTRACT

System and method for maintenance support for electronically actuated and/or monitored appliances implemented within an electronically networked automation system, having a central monitoring unit processing present operating parameters for appliances for establishing the servicing state of the appliances using comparison operating parameters, where an external SSIS server logically combines the servicing request established by the monitoring unit with appliance-specific servicing performance information stored in a database and forwards these data to electronic mobile terminals of the servicing personnel in order to perform the servicing.

12 Claims, 2 Drawing Sheets

This application claims priority under 35 U.S.C. §119 to German Patent Application No. 10 2007 037 247.9 filed in Germany on Aug. 7, 2007, the entire content of which is hereby incorporated by reference in its entirety.

SYSTEM AND METHOD FOR MAINTENANCE SUPPORT

RELATED APPLICATION

This application claims priority under 35 U.S.C. §119 to German Patent Application No. 10 2007 037 247.9 filed in Germany on Aug. 7, 2007, the entire content of which is hereby incorporated by reference in its entirety.

TECHNICAL FIELD

The present disclosure relates to a system and a method for maintenance support for electronically actuated and/or monitored appliances implemented within an electronically networked automation system, having a central monitoring unit which processes present operating parameters for the appliances in order to establish the servicing state of the appliances using comparison operating parameters.

BACKGROUND INFORMATION

The field of use for the present disclosure extends primarily to automation systems in which the system-internal communication between the appliances usually takes place using field bus protocols, such as PROFIBUS. Appliances which communicate with one another and/or with a central control entity within the framework of such an automation system may be in the form of actuators, analysis appliances, drives, motor protection units, switchgear, sensors (particularly for pressure, temperature and flow measurements). Every appliance of the type of interest here is equipped with an electronics units which can perform various types of functions, such as operator control functions, startup functions, diagnosis functions, servicing functions, authorization functions, alarm processing functions and service-life monitoring functions.

The trend in the art is increasingly to integrate ever higher levels of intelligence into the automation system, particularly into the individual appliances, in order to modernize work processes, improve processing product quality and maximize availability. In particular, intelligent diagnosis functions make it possible to monitor the state of wear of dynamic seals, the reaction time of a control element after a setpoint value has been prescribed, pressure monitoring operations in line sections and the like in order to perform servicing and maintenance measures efficiently over the course of regular need-controlled servicing intervals.

US 2007/35398 A1 reveals a technical solution for such state monitoring of appliances in an automation system. This software-based technical solution gathers status information from appliances in an automation system and outputs them via a web page. A user interface can be used to display this web page, together with associated data records. This information can be used to establish a need for servicing.

A drawback of this technical solution is that the method only signals a need for servicing or maintenance for an appliance, but does not provide any significant assistance for the servicing or maintenance which then inevitably needs to be performed. For this, the servicing personnel needs to resort conventionally to a library of manuals for the relevant appliance in order to obtain more detailed information about the setup and operation and also servicing specifications of the appliance. Often, such manuals are not available directly in-situ but rather are located centrally with an external servicing service. To date, this problem has been solved by virtue of an expert in a central external servicing service supplying information which is required for servicing or maintenance to the servicing personnel in-situ by telephone. This communication path between the expert and the servicing personnel in-situ can result in time delays on account of interrupted information channels or even misunderstandings through the wrong questions being asked or the wrong responses being given.

SUMMARY

Exemplary embodiments disclosed herein can provide an integrated system and a method for maintenance support which can be used to assure qualified and reliable servicing without repair of appliances in an automation system according to need within a very short time.

An exemplary system for maintenance support is disclosed for electronically actuated and/or monitored appliances implemented within an electronically networked automation system, having a monitoring unit which processes present operating parameters for appliances in order to establish the servicing state of the appliances using comparison operating parameters, wherein an external SSIS server logically combines the servicing request established by the monitoring unit with appliance-specific servicing performance information stored in a database and forwards this information in file form to electronic mobile terminals belonging to the servicing personnel in order to perform the servicing.

A method for maintenance support for electronically actuated and/or monitored appliances which are implemented within an electronically networked automation system and whose present operating parameters are recorded by a monitoring unit in order to establish the servicing state of the appliances using comparison operating parameters, wherein an external SSIS server logically combines the servicing request established by the monitoring unit with appliance-specific servicing performance information stored in a database, and wherein these data are forwarded to electronic mobile terminals of the servicing personnel in order to perform the servicing.

In another aspect, a maintenance support method is disclosed for electronically actuated and/or monitored appliances which are implemented within an electronically networked automation system. The method comprises recording present operating parameters by a monitoring unit in order to establish a servicing state of the appliances using comparison operating parameters; logically combining a servicing request established by the monitoring unit with appliance-specific servicing performance information stored in a database; and forwarding these data to electronic mobile terminals for servicing.

BRIEF DESCRIPTION OF THE DRAWINGS

Further improving measures are illustrated in more detail below together with the description of an exemplary embodiment of the disclosure with reference to the figures, in which.

DETAILED DESCRIPTION

Figure 1:
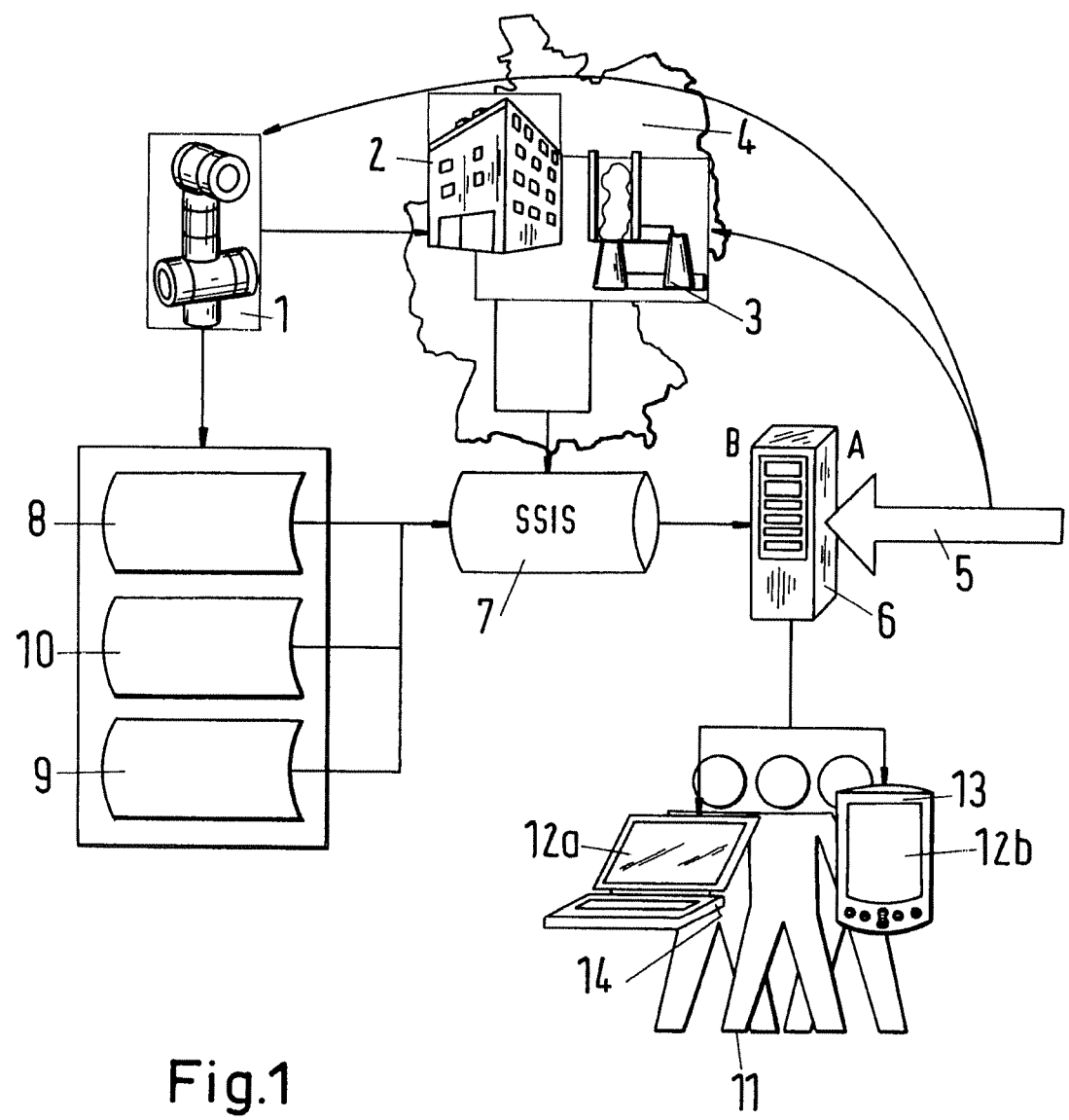
FIG. 1 shows a schematic illustration of an exemplary system for maintenance support and, FIG. 2 shows a flowchart of an exemplary method practiced within the system shown in FIG. 1.

The disclosure encompasses the technical teaching that an external service center links the servicing request A established by the monitoring unit to appliance-specific servicing performance information B stored in a database and forwards these data to electronic mobile terminals of the servicing personnel in order to perform the servicing.

The disclosed solution can avoid repeated journeys for repeated repair attempts on account of incorrect communication or unavailable servicing information. The disclosed technical solution allows correct communication through the explicit combination of the servicing request with the servicing performance information. Since misunderstandings are avoided to this extent, it is possible to achieve a high level of quality for the servicing or repair.

The disclosed servicing performance information may be in different forms according to further exemplary improving measures, which include the servicing performance information either individually or in combination with one another. By way of example, this may involve the use of a video clip for providing audio-visual information about setup and servicing features of the appliance to be serviced. Such a video clip may thus comprise illustrations of how a particularly part of an appliance is dismantled, parts are replaced and the like.

Such video clips can also be stored in retrievable form in digital form in appliance-specific data records in the database connected to the SSIS server. In addition, it is also possible to provide the servicing performance information in the form of a text instruction matching the specific servicing case identified on the basis of the servicing request. Such a text instruction is likewise suitable for being stored in retrievable form in a data record in an electronic database. Such a text instruction can contain a series of specific servicing steps to be performed in succession which the servicing personnel needs to execute point by point in-situ in order to arrive at the desired success.

In line with a further exemplary improving measure, provision is made for the servicing performance information also to contain a piece of navigation information for finding the appliance to be serviced within the automation system.

Another exemplary improving measure provides for such a piece of navigation information to have a multilevel structure with at least two of the following pieces of route information:

A first piece of route information may comprise the postal address for finding a factory site containing the automation system using the present position of the servicing personnel's mobile terminal equipped with a device for satellite-assisted navigation.

A second piece of route information can comprise, on the basis of the postal address of the factory site which contains the automation system, a second piece of route information for finding a building or factory site section on the factory site which at least to some extent contains the automation system.

A third piece of route information can be used to allow the appliance which is to be serviced within the building or factory site section to be found from the entrance to the building or factory site section. This can be done by indicating floor, room number and nameplate for the appliance in text form, for example.

By contrast, it is possible to show route information for finding the postal address and for finding the automation system on coarser approximation levels of the disclosed navigation with textual and also graphical support.

The mobile terminals used should have a suitable graphical outward interface. In particular, laptops or PDAs (Personal Digital Assistants) are suitable for this, and these need to be equipped with a device for satellite-assisted navigation in order to perform the navigation tasks. Such mobile terminals can be used to show the aforementioned video clips for providing audio-visual information about setup and servicing features of the appliance to be serviced or route information for navigation purposes, for example, in sufficient quality.

As a further exemplary improving measure, it is proposed that mobile terminals belonging to the servicing personnel be equipped with a camera. This camera forms the appliance-based prerequisite for the SSIS server being able to be used to carry out audio-visual real-time communication with experts in the service center in order to support the servicing work. If unforeseen problems arise when performing the servicing tasks supporting in line with the disclosure, for example, this additional option may be used to ultimately achieve the desired success with the servicing task.

It is likewise possible to equip mobile terminals belonging to the servicing personnel with a communication interface for wire-based local connection to the automation system, and with means for interchanging information relating to servicing with the SSIS server using the automation system. This measure is an alternative information interchange channel for the otherwise usually used wireless communication by mobile radio.

On the basis of FIG. 1, the appliance 1, which is in the form of a flow meter in this case, is part of an electronically networked automation system (not shown in more detail). The electronic networking is effected using a BUS protocol—likewise not shown here. The appliance 1 in the automation system is installed within a building 2 on a factory site 3 which has an associated postal address 4 within the road network in the Federal Republic of Germany.

A monitoring unit 5 in the automation system collects present operating parameters for the appliance 1 which are detected by sensor, in this case for example reaction times to allow inferences to be made about the present servicing state of the appliance 1 using comparison operating parameters stored in the monitoring unit 5. As a result of this, the monitoring unit 5 outputs a servicing request A to an SSIS (Service Support Information System) server 6 when required. The SSIS server 6 then requests appliance-specific servicing performance information B from a database 7. This servicing performance information B is in the form of video clips for providing audio-visual information about setup and servicing features of the appliance 1 to be serviced and also text instructions 9 which contain a series of servicing steps to be performed in succession for the appliance 1. In addition, the database 7 is also supplied with a piece of navigation information 10 for finding the appliance 1 to be serviced within the automation system.

In this exemplary embodiment, the navigation information has a three-level structure and comprises, as a first piece of route information, the postal address 4 of the factory site 3 on which the automation system is located. A second, more detailed piece of route information contains the location of the building 2 within the factory site 3 and a third piece of route information, which is of textual nature in this case, contains specific details of where precisely within the building 2 the appliance 1 to be serviced is located.

The servicing personnel 11 is thus rendered capable of using a mobile terminal 12a, which is in the form of a laptop in this case and contains a GPS module for the purpose of satellite-assisted navigation, to find the appliance 1 to be serviced precisely from any starting point. In addition to a laptop 12a, the servicing personnel 11 may also use a PDA with an integrated GPS module for satellite-assisted navigation as mobile terminal 12b. The mobile terminal 12b additionally has a camera 13 for the purpose of audio-visual real-time communication by the SSIS server 6 with an expert located there. As an alternative, the other mobile terminal 12a has a communication interface 14 for wire-based local connection to the automation system, which can subsequently likewise be used to set up a connection to the SSIS server 6 for the same purpose.

In addition, a further server may be provided which, as an SSCS (Service Support Communication System) server, is tailored specifically to the needs of communication with the service personnel. Advantageously, the split over two specialized servers makes it possible to cope with larger volumes of requests in an extensive automation system.

Figure 2:
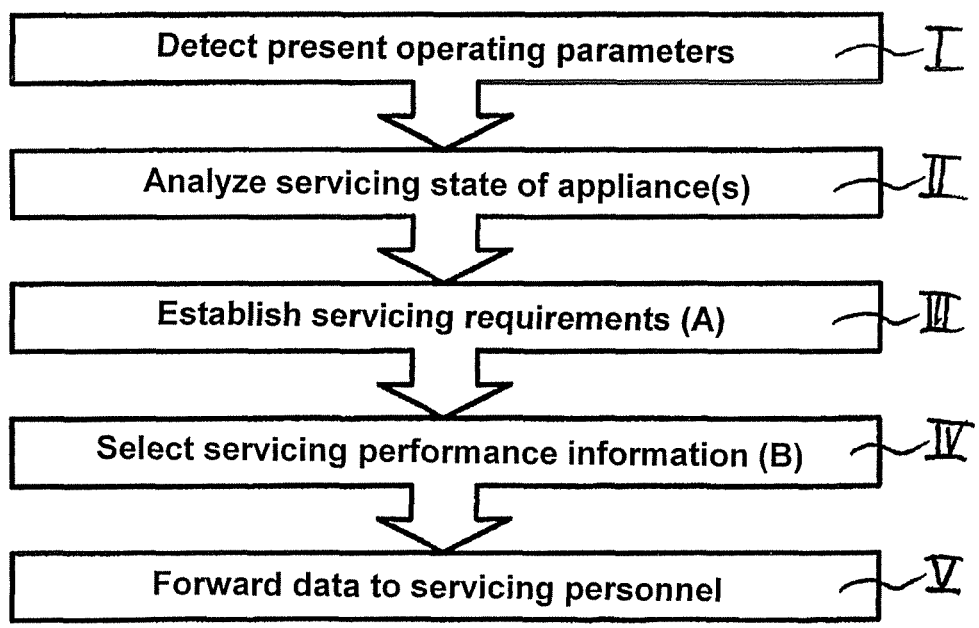

On the basis of FIG. 2, the exemplary method for maintenance support on the basis of the system described above contains the following method steps:

First of all, present operating parameters are recorded by a monitoring unit implemented centrally in the automation system (I).

Next, the monitoring unit uses a comparison with comparison operating parameters to analyze the present servicing state of the appliance on the basis of this input information (II).

It is then established whether servicing is required and, if so, a servicing request A is output (III).

Next, suitable appliance-specific servicing performance information B, containing video clips, text instructions and/or navigation information, stored in a database is selected for the established servicing request A (IV) in order finally to forward it as data to electronic mobile terminals belonging to the servicing personnel for the purpose of performing the servicing (V).

In this context, it is crucial that these data not only comprise simple voice information or simple individual text messages from an expert in a control center but rather, in predefined fashion, complete information in the form of video clips, and text instruction sequences which can be made available together with navigation information to the servicing personnel's mobile terminal, so that the requested servicing/repair can be carried out in a qualified and efficient manner.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

| | |
|---|---|
| 1 | Terminal |
| 2 | Building |
| 3 | Factory site |
| 4 | Postal address |
| 5 | Monitoring unit |
| 6 | SSIS Server |
| 7 | Database |
| 8 | Video clip |
| 9 | Text instruction |
| 10 | Navigation information |
| 11 | Servicing personnel |
| 12 | Mobile terminal |
| 13 | Camera |
| 14 | Communication interface |

What is claimed is:

1. A system for maintenance support of at least one of electronically actuated and monitored appliances implemented within an electronically networked automation system, comprising:

a monitoring unit comprising a processor which processes present operating parameters for the appliances in order to establish a servicing state of the appliances using comparison operating parameters and an external SSIS (Service Support Information System) server for logically combining a servicing request established by the monitoring unit with appliance-specific servicing performance information stored in a database and forwarding this information in file form to electronic mobile terminals belonging to a servicing personnel in order to perform servicing;

wherein the servicing performance information comprises:

a video clip for providing audio-visual information about at least one of setup and servicing features of the appliance to be serviced; and navigation information for finding the appliance to be serviced within the automation system accommodated in a building or factory site section, from an entrance to the building or factory site section.

2. The system as claimed in claim 1, wherein
the navigation information has a multilevel structure, comprising at least one of the following pieces of route information:

a first piece of route information for finding the postal address of a factory site comprising the automation system using the present position of the servicing personnel's mobile terminal equipped with a GPS module and a second piece of route information for finding the building or factory site section on the factory site which contains the automation system, from the postal address.

3. The system as claimed in claim 1, wherein
the servicing performance information comprises a text instruction, matching the specific servicing case, with servicing steps to be performed in order.

4. The system as claimed in claim 1, wherein
the mobile terminal of the servicing personnel is equipped with a camera for real-time communication via the SSIS server during the servicing work.

5. The system as claimed in claim 1, wherein
the mobile terminal of the servicing personnel is equipped with a communication interface for local connection to the automation system, and with means for interchanging servicing-related information with the SSIS server via the automation system.

6. The system as claimed in claim 1, wherein the navigation information includes satellite assisted navigation information.

7. A method for maintenance support for at least one of electronically actuated and monitored appliances which are implemented within an electronically networked automation system and whose present operating parameters are monitored by a monitoring unit in order to establish the servicing state of the appliances using comparison operating parameters, wherein
an external SSIS (Service Support Information System) server for logically combining a servicing request established by the monitoring unit with appliance-specific servicing performance information stored in a database, and wherein these data are forwarded to electronic mobile terminals of servicing personnel in order to perform servicing;

wherein the SSIS server transmits servicing performance information to the relevant servicing personnel's mobile terminal containing a video clip for providing audio-visual information about at least one of setup and servicing features of the appliance to be serviced and;

navigation information comprising information for finding the appliance to be serviced in a building or factory site section, from an entrance to the building or factory site section.

8. The method as claimed in claim 7, wherein the navigation information includes satellite assisted navigation information.

9. A maintenance support method for at least one of electronically actuated and monitored appliances which are implemented within an electronically networked automation system, the method comprising:

recording present operating parameters by a monitoring unit in order to establish a servicing state of the appliances using comparison operating parameters;

logically combining a servicing request established by the monitoring unit with appliance-specific servicing performance information stored in a database;

forwarding these data to electronic mobile terminals for servicing; and wherein the data contains:

a video clip for providing audio-visual information about at least one of setup and servicing features of the appliance to be serviced; and navigation information for finding the appliance to be serviced within the automation system accommodated in a building or factory site section, from an entrance to the building or factory site section.

10. The maintenance support method as claimed in claim 9, comprising:

an external SSIS server (Service Support Information System) for logically combining a servicing request established by the monitoring unit with appliance-specific servicing performance information stored in a database.

11. The maintenance support method as claimed in claim 9, wherein the electronic mobile terminals are associated with servicing personnel in order to perform the servicing.

12. The maintenance support method as claimed in claim 9, wherein the navigation information includes satellite assisted navigation information.

* * * * *